US012691309B2

(12) United States Patent
Gorman

(10) Patent No.: US 12,691,309 B2
(45) Date of Patent: Jul. 28, 2026

(54) EMBER ARMOR WILDFIRE PROTECTION SPRINKLER

(71) Applicant: Matthew Gorman, Coquitlam (CA)

(72) Inventor: Matthew Gorman, Coquitlam (CA)

( * ) Notice: Subject to any disclaimer, the term of this patent is extended or adjusted under 35 U.S.C. 154(b) by 302 days.

(21) Appl. No.: 18/534,604

(22) Filed: Dec. 9, 2023

(65) Prior Publication Data

US 2025/0186816 A1 Jun. 12, 2025

(51) Int. Cl.
*A62C 3/02* (2006.01)
*A62C 35/68* (2006.01)

(52) U.S. Cl.
CPC .......... *A62C 3/0214* (2013.01); *A62C 3/0292* (2013.01); *A62C 35/68* (2013.01)

(58) Field of Classification Search
CPC ....... A62C 3/02; A62C 3/0214; A62C 3/0292; A62C 35/68
See application file for complete search history.

(56) References Cited

U.S. PATENT DOCUMENTS

2008/0308285 A1* 12/2008 Su .......................... A62C 37/11 239/522
2011/0247842 A1* 10/2011 Huber .................... A62C 35/58 169/54
2022/0288434 A1* 9/2022 Olin ................... A62C 99/0018

OTHER PUBLICATIONS

Western Wildfire Response LTD, Jul. 17, 2022, https://web.archive.org/web/20220717002243/https://westernwildfire.ca/ (Year: 2022).*
Matweb Material Property Data, Brass and Stainless Steel (Year: 2025).*

* cited by examiner

*Primary Examiner* — Steven M Sutherland
(74) *Attorney, Agent, or Firm* — Lambert Shortell & Connaughton; David J. Connaughton, Jr.; Justin P. Tinger

(57) ABSTRACT

Ember Armor Wildfire Protection Sprinklers offer a versatile and comprehensive defense against wildfires, easily mountable on various structures like homes, roofs, and trees with just five screws. Upon installation, it establishes a hydration bubble around the protected area, extinguishing embers and creating a wet perimeter to deter ground fires. The innovative powder-coated stainless steel and brass bracket, with a high melting point, ensures year-round durability, shedding rain and sprinkler water to safeguard the structure. The customizable bracket supports different sprinkler heads, with a filter-free option to prevent clogging. Designed for homeowner convenience, it eliminates the need for seasonal setup and features color options for aesthetic appeal. Additionally, the kit includes a firefighter alert sign, mounted at the property entrance, ensuring heightened awareness of wildfire protection measures.

16 Claims, 13 Drawing Sheets

EMBER ARMOR WILDFIRE PROTECTION SPRINKLER

TECHNICAL FIELD

The present disclosure relates to the field of life safety systems, and more specifically, systems and methods for fire prevention.

BACKGROUND

The following description includes information that may be useful in understanding the present disclosure. It is not an admission that any of the information provided herein is prior art or relevant to the presently claimed disclosure, or that any publication specifically or implicitly referenced is prior art.

Wildfires pose a significant threat to communities, often resulting in devastating consequences for homes and the environment. Existing fire prevention and protection systems may have limitations in effectively safeguarding structures during intense wildfire events.

US Patent US20190168035A1, titled "Remotely controlled methods and systems for preventing wildfire embers from entering into the interior spaces of buildings during wildfire ember storms," describes an advanced automated wildfire ember misting-type suppression system, incorporating electronic detection devices such as infra-red, thermal-imaging, and relative humidity sensors. This system is designed for remote control and operates by automatically detecting the presence of a wildfire in proximity to a wood-framed building. Upon detection, the system initiates the generation of a cloud of wildfire ember suppressing mist composed of microscopic droplets of a clean anti-fire (AF) liquid. Notably, these droplets exhibit two key functionalities: rapid vaporization upon contact with flying wildfire embers and interference with free-radical chemical reactions on the surface of each combusting ember within the wildfire storm surrounding the wood-framed building. This innovative approach emphasizes precision, automation, and the integration of advanced sensor technologies to enhance wildfire suppression efficiency in real-time.

U.S. Pat. No. 8,794,341B2 titled "Rain maker wildfire protection and containment system" describes an apparatus, system and method for fire suppression and containment is provided in accordance with one embodiment of the invention. A conduit with a plurality of nozzle connections, in various configurations to create specific fire suppressant discharge patterns. Each conduit can be operated individually or connected to another conduit by a predetermined length of hose forming a contiguous system, traversing large areas of land. The invention and components form a multi-purpose fire suppression apparatus. The system can be operated remotely or manually. An alternative embodiment can be installed in residential, commercial and industrial applications. Each system can be custom designed based upon environmental engineering requirements and system application—with regard to conduit diameters, material composition, shape, length and nozzle design without leaving the core design. The system components can also incorporate sensors, monitoring devices, robotics (i.e. RM all-terrain vehicle) satellite imaging and wireless technology.

US20100071917A1 titled "Residential fire protection system and method" describes an outdoors residential fire-suppression system and method, employing very large water reservoirs, pumping means, one or more pipe circuits containing a plurality of batteries of fire extinguishing nozzles, and deployed around buildings on a property, that may be activated upon the automatic detection of a fire condition or manually as a preventive measure to create a fire barrier. A zonal version of the system and method employs a plurality of outdoors residential fire-suppression system that can be activated individually or collectively to combat a wildfire or to prevent a wildfire from spreading. The zonal version of the system and method can be collectively operated by fire authorities by a plurality of means, including satellite and wireless transmissions. The system can operate independently of any public energy supply and may be activated automatically or manually. Furthermore, the fire suppression system and method has the capability to issue audiovisual alarms, dial predefined telephone numbers, and report an impending fire condition.

US20150238789A1 titled "Roof top Sprinkler System" describes a system of fire protective sprinklers that fully cover and wet all areas of a structural roof threatened by a rapidly spreading fire, comprising a strategically placed array of roof mounted, long range water sprinkler heads, capable of fully covering the surface of the roof with a continual spray, keeping the roof wet to reduce its susceptibility to airborne embers that otherwise might ignite a fire; piping to carry water to the sprinkler heads; and a water source to provide water.

U.S. Pat. No. 6,360,968B1 titled "Wildfire protection system" describes a wildfire protection system has rotating sprinklers (1) on sprinkler legs (2) positioned temporarily or indefinitely as needed on roofs (10) with the sprinkler legs resting on opposite slopes (6) from a ridge (5) of the roof and removed for sprinkler irrigation or easily disassembled for compact storage when not in use for wildfire protection. The rotating sprinklers can wet not only roof tops but also nearby trees (13), shrubs (14) and areas for protection against flying sparks and burning particles. The rotating sprinklers are preferably a low-weight plastic type, and the sprinkler legs are preferably four low-weight plastic members that intersect at a series connection for garden-hose water supply to one or more of the rotating sprinklers. The rotating sprinklers are saddled on a roof top with two of the sprinkler legs placed on each of two opposite roof slopes. The low weight of the rotating sprinklers allows them to be placed easily on roofs with access by ladder or structured to be positioned indefinitely. Anchor-weighting for extra resistance to winds, if necessary, can be provided by sandbags or by water containers (24) on sprinkler footings (4) with water supplied automatically from a garden water hose (16). The water containers can be removable and/or emptied easily and can have runner ends (25) contoured for sliding rooftop or irrigation transport. Backup supply of water can be provided from an available reservoir (17) with a pump (18) powered by a motor (20) or a heat engine (22) in a power system (19) that is protected from foreseeable wildfire.

As a result, there exists a need for improvements over the prior art and more particularly for a more efficient way.

Recognizing this, the invention aims to address the shortcomings of current solutions by providing an innovative and versatile approach to wildfire protection. The background encompasses the understanding of the urgency to develop a system that is not only efficient in extinguishing embers and preventing ground fires but is also adaptable to diverse structural configurations. The invention draws inspiration from the increasing frequency and severity of wildfires, seeking to provide a comprehensive solution that prioritizes the safety of homes and the surrounding environment without compromising on user convenience and system durability.

SUMMARY OF THE DISCLOSURE

The main focus of the invention is an Ember Armor Wildfire Protection Sprinklers that represent a cutting-edge innovation in the realm of wildfire defense. With a focus on simplicity and versatility, these sprinklers can be easily mounted on various structures, including the peaks of homes, edges of roofs, chimneys, plumbing vents, sides of buildings, and even on trees and deck posts. The system's installation involves driving just five screws into the chosen location, or alternatively using hose clamps when fastening to existing pipes or chimneys making it accessible for homeowners seeking a reliable and user-friendly permanently mounted solution designed to withstand the outdoor elements and be available to firefighting services year-round.

Once in place, the Ember Armor creates a protective hydration bubble around the structure. This innovative feature plays a crucial role in combating wildfires by extinguishing airborne embers and establishing a wet perimeter. The wet perimeter acts as a formidable barrier, thwarting the advance of ground fires towards the protected building. This dual-action approach significantly enhances the system's effectiveness in safeguarding homes and structures during wildfire events.

A key component of Ember Armor's resilience is the bracket's construction. Crafted from powder-coated stainless steel and brass, the bracket exhibits an impressive melting point of 927° C. for brass and over 1400° C. for stainless steel. This ensures that the system remains structurally intact and functional even under the extreme heat conditions associated with wildfires. What sets Ember Armor apart is its commitment to year-round protection. The bracket is intelligently designed to remain on the structure throughout the year, irrespective of weather conditions. Its ability to shed both rainwater and sprinkler water away from the building not only adds to its durability but also ensures a strong and enduring connection, reinforcing its efficacy in the long term.

The summary of the disclosure does not necessarily disclose all the features essential for defining the disclosure. The disclosure may reside in a sub-combination of the disclosed features. The various combinations and sub-combination are fully described in the detailed description.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION OF DRAWINGS

Figure 1:
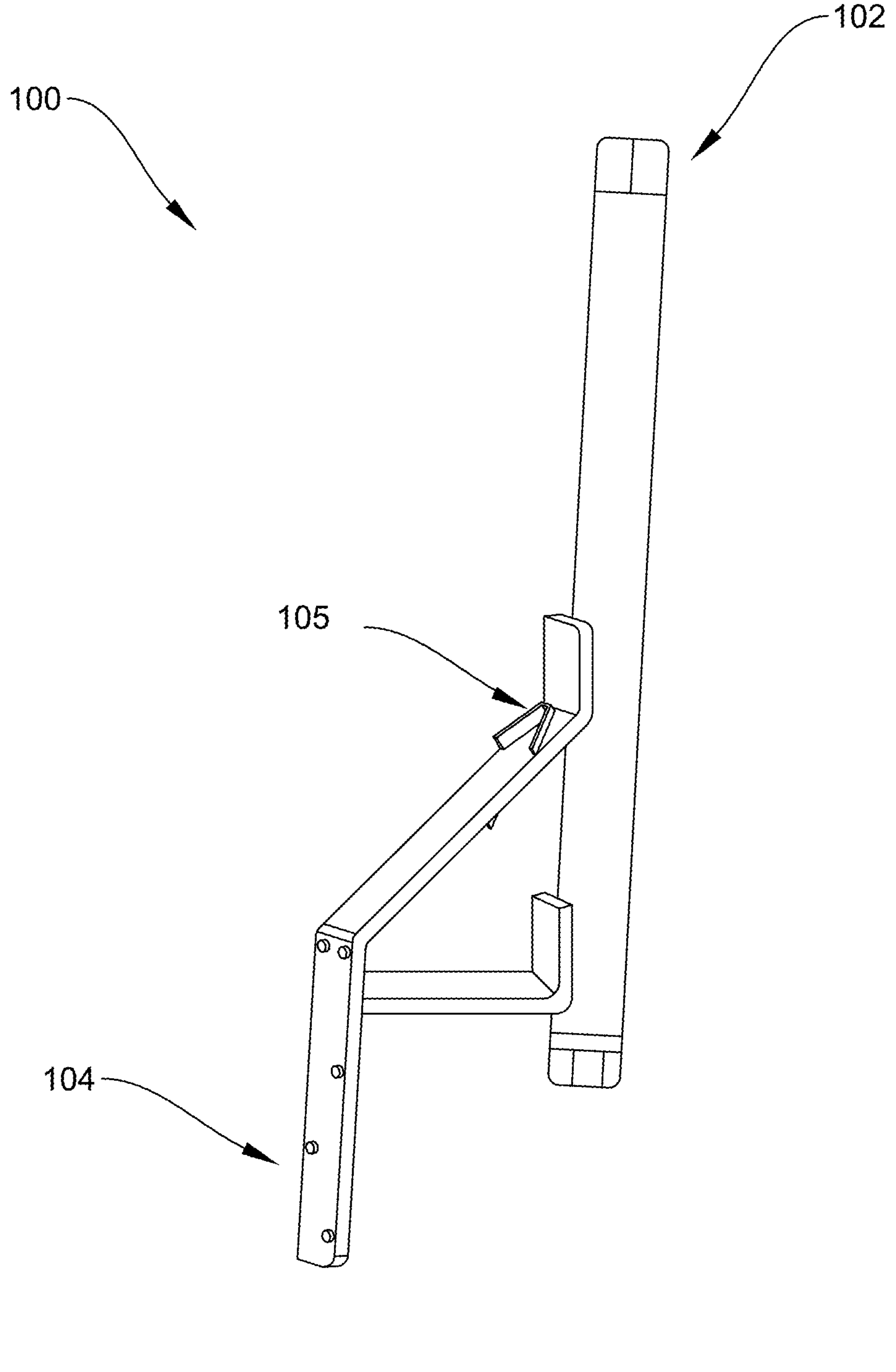
FIG. 1 is a view of an Ember Armor Wildfire Protection Sprinkler according to the present invention.

To make the objectives, technical solutions, and advantages of this application clearer, the following clearly and completely describes the technical solutions in this application with reference to accompanying drawings in this application. Obviously, described embodiments are a part rather than all of embodiments of this application. All other embodiments obtained by a person of ordinary skill in the art based on embodiments of this application without creative efforts shall fall within the protection scope of this application.

Various terms as used herein are shown below. To the extent a term used, it should be given the broadest definition persons in the pertinent art have given that term as reflected in printed publications and issued patents at the time of filing.

A wildfire protection sprinkler system comprising a durable bracket, constructed from powder-coated stainless steel and brass, a plurality of sprinkler heads designed for mounting on the durable bracket, a hose for connecting the sprinkler head mounted on the bracket with the water outlet, a mechanism for creating a hydration bubble around a protected structure upon activation, said hydration bubble extinguishing airborne wildfire embers and establishing a wet perimeter to prevent the advancement of ground fires and an integrated firefighter alert system, comprises a property sign mounted at the front entrance, notifying firefighters of the location of wildfire protection sprinklers.

The wildfire protection sprinkler system has brackets, which exhibit a melting point of at least 927° C. for brass and over 1400° C. for stainless steel.

The bracket's structure is designed to minimize vibrations, wherein the vibrations hamper the rotation of impact sprinklers.

The bracket has a design that incorporates a robust metal arm and cross member, enhancing stability for the proper functioning of impact sprinkler heads.

The bracket design includes a carefully calculated angle and height configuration, facilitating secure attachment to a facia board.

The bracket design is strategically crafted to provide a maximum hydration bubble around the structure, essential for wildfire protection.

The bracket design ingeniously leverages the natural water shedding capability when mounted on the peak of a building structure, allowing the sprinkler water spray to rain down from the top of the roof, optimizing the distribution of water for enhanced wildfire protection.

The plurality of sprinkler heads is mountable on structures, such as the peak of a home, the edge of a roof, the side of a building, on trees, and deck posts, allowing for versatile and strategic installation.

The colors of the Ember Armor are carefully selected to match homeowner preferences, ensuring that the protective system complements the visual aesthetics of the protected structure.

The hose is mounting under the facia board using clips. The hose makes the sprinkler accessible from the ground.

Further, a method for installing a wildfire protection sprinkler system, comprising the following steps selecting a suitable location for installing the sprinkler system, considering options such as the peak of structures, edges of roofs, sides of buildings, trees, or deck posts, preparing the chosen location for installation, ensuring it is free from obstructions and suitable for secure mounting, driving five screws into the chosen location to facilitate the secure attachment of the sprinkler system.

Installing a durable bracket, constructed from powder-coated stainless steel and brass, attaching a plurality of sprinkler heads to the bracket, providing customizable coverage based on the selected location, activating a mechanism for creating a hydration bubble around the protected structure upon installation, aiming to extinguish airborne wildfire embers and establish a wet perimeter to prevent the advancement of ground fires.

The system and method discussed above is compatible with a variety of sprinkler heads, including a filter-free sprinkler head in the kit to minimize the risk of clogging during water drawing from potentially dirty sources during a wildfire event.

The step of employing a year-round installation design includes designing the bracket to shed rainwater and sprinkler water away from the building, contributing to lasting durability and a robust connection.

A wildfire protection system comprising a structure-mounted apparatus, said apparatus comprising a set of strategically positioned deflectors designed to actively channel rainwater and sprinkler water away from the protected structure, an integrated mounting mechanism securing the deflectors to the structure to ensure stability and durability, a configurable design, allowing adaptation to diverse structural configurations for optimal water shedding.

A material composition resistant to environmental factors, including but not limited to, rain, snow, and exposure to the elements, an alignment that minimizes the risk of water accumulation around vulnerable areas of the structure during both wildfire events and adverse weather conditions.

The alignment of deflectors minimizes the risk of water-related damage to the protected structure, including but not limited to flooding, erosion, and potential structural compromise, during both wildfire and adverse weather events.

The versatility of the Ember Armor system extends to its compatibility with a variety of sprinkler heads. The kit includes a filter-free ½" impact sprinkler head, addressing the potential issue of clogging when drawing water from dirty sources during a wildfire. This adaptability makes the system suitable for different scenarios, providing homeowners with a customizable solution tailored to their specific needs. The sprinkler head direction can also be controlled to avoid causing water damage to areas that may need to be avoided such as doors, windows, skylights, chimneys, and other areas that may be susceptible to heavy water spray.

Ember Armor also recognizes the importance of communication during wildfire events. The inclusion of a reflective property sign which serves a dual purpose. Beyond aesthetics, the sign acts as a visible indicator for firefighters, alerting them to the presence of wildfire sprinklers on the property. Strategically mounted at the front entrance, this sign becomes a valuable tool for firefighting teams, facilitating a more targeted and effective response.

The system's design incorporates a sophisticated mechanism aimed at efficiently channeling rainwater and sprinkler water away from the home where the bracket is affixed, utilizing strategically positioned deflectors. These deflectors serve as integral components that actively guide excess water flow traveling down the bracket arm during sprinkler activation or during rain events, preventing it from accumulating or reaching susceptible areas of the building. Their strategic placement ensures that water is directed away from vulnerable fastener points, safeguarding the structure from potential damage during adverse weather conditions. The deflectors are meticulously designed to optimize water shedding, taking into account the contours and layout of the home. By doing so, the system not only enhances its protective capabilities during wildfire events but also minimizes the risk of water-related issues such as flooding or structural damage. This thoughtful approach to water management showcases the system's commitment to providing comprehensive protection without compromising the structural integrity of the home. As a result, the incorporation of these deflectors represents a crucial aspect of the system's design, contributing to its effectiveness in safeguarding homes during both wildfires and inclement weather.

FIG. 1 is a view of an Ember Armor Wildfire Protection Sprinkler according to the present invention.

Ember Armor Wildfire Protection Sprinkler system (100) is purposefully designed with a specific focus on wildfire defense rather than general irrigation or routine watering of gardens and lawns. The system's primary objective is to create a protective hydration bubble around structures, extinguishing wildfire embers and establishing a wet perimeter during wildfire events. Unlike traditional irrigation systems, Ember Armor is not intended for everyday use to water gardens, lawns, or other landscaping features. Instead, its design and functionality are tailored to address the unique challenges posed by wildfires. The exclusion of regular irrigation capabilities underscores the system's specialized nature, ensuring that it remains dedicated to its core mission of enhancing the protection of homes and structures during wildfire incidents. This distinction reinforces Ember Armor's commitment to providing a targeted and effective solution for wildfire defense, aligning its features and capabilities with the specific needs of homeowners facing the increasing threat of wildfires.

The Ember Armor Wildfire Protection Sprinklers system (100) involves several key components that work cohesively to create a protective hydration bubble around structures during wildfire events. Some of the components are mentioned below:

Sprinkler Heads (102): The core element of the system, the sprinkler heads, are strategically placed on the peak of homes, edges of roofs, sides of buildings, chimneys, pipe vents, trees, and deck posts. They are responsible for emitting water to create a hydration bubble. The system supports a variety of sprinkler heads to offer flexibility. The included sprinkler head in the kit is specifically designed to be filter-free, reducing the risk of clogging when drawing water from potentially dirty sources during a wildfire event. It is also designed to avoid areas that may cause water damage to the structure.

Bracket (104): Constructed from powder-coated stainless steel and brass, the bracket provides structural support and stability to the sprinkler heads. Stability has been extensively engineered to ensure maximum rotation of impact sprinkler heads as bracket vibrations can hinder the rotation of impact sprinklers. The design includes a strong metal arm and cross member for maximum stability. The design also incorporates an angle and height to ensure that while affixed to a facia board it can still avoid most roof overhangs and extend high enough beyond the roof line to provide a maximum hydration bubble around the structure without compromising stability or creating vibration that may reduce the effectiveness of the impact sprinkler head rotation. When mounted on the peak of a building this design also allows the sprinkler water spray to rain down from the top of the roof using the natural water shedding capability of the structure. The brass component has a melting point of 927° C., and the stainless-steel component has a melting point of over 1400° C., ensuring the bracket's resilience in the face of extreme heat during a wildfire.

Durability Design: The bracket is designed to stay on the structure or building throughout the year, including during snowy weather and winter months. This eliminates the need for homeowners to repeatedly install and remove the system each wildfire season.

Rainwater and Sprinkler Water Shedding: The bracket is intelligently designed to shed both rainwater and sprinkler water away from the building. This design not only enhances the system's durability but also ensures a strong and lasting connection to the structure.

Hydration Bubble Creation: The collective action of the sprinkler heads and bracket creates a hydration bubble around the structure being protected. This hydration bubble serves the crucial function of extinguishing wildfire embers, preventing them from igniting the structure.

The setting the stays or stops on the sprinkler head avoids water being sprayed in areas where a wildfire prevention system may cause water damage when the system is activated. A separate concept would be the stops or water deflectors on the bracket that shed water from the sprinkler system (when activated) but also rainwater (when not activated) away from the building.

Firefighter Alert System: The kit includes a property sign that is typically mounted at the front entrance of the property. This sign serves to alert firefighters to the presence of wildfire sprinklers on the property, aiding them in their firefighting efforts. Firefighters can activate the system when homeowners are evacuated without ladders, from the ground by connecting the sprinkler hose to their own fire equipment or the homeowners own water system.

Beyond functionality, the Ember Armor acknowledges the importance of aesthetics. The system's colors are thoughtfully selected to align with homeowner preferences, ensuring that the protective system not only serves a critical function but also complements the visual aesthetics of the property. The kit includes a fire-resistant hose and clamps allowing it to be neatly hidden behind the facia board when mounted on a home. This attention to design makes Ember Armor a comprehensive and visually appealing solution for wildfire protection.

The Ember Armor is explicitly designed for emergency situations, particularly during wildfires. It is not intended for regular irrigation purposes or routine watering of gardens, lawns, or other landscaping features. All types of sprinkler heads, including those in the Ember Armor system, have the potential to become clogged if water sources are not adequately filtered. The product provides specific warnings and guidance, particularly when using pumps in lakes. Users are advised against drawing debris into the pump intake to prevent clogging issues. If sprinkler heads become clogged, users are instructed to remove them, wash in clean water, and clear using compressed air.

The invention is intended for extremely infrequent use to ensure optimal operation. This aligns with its emergency-focused design. The goal is to minimize the risk of water damage, especially in areas such as chimneys and other openings that may not be properly sealed. The stated intention of the product is to reduce the risk associated with wildfires and improve the odds of structures surviving such events. This is presented as a primary goal despite the acknowledged risk of water damage.

The invention comprises a structure-mounted apparatus designed to enhance the protection of buildings, especially during wildfire events. The apparatus includes a set of deflectors strategically positioned to actively manage the flow of rainwater and sprinkler water away from the protected structure. These deflectors play a crucial role in preventing water accumulation around vulnerable areas. An integrated mounting mechanism secures the deflectors to the structure, ensuring stability and durability. This mechanism is designed to withstand environmental challenges, such as strong winds or heavy rainfall. The invention features a configurable design, allowing adaptability to diverse structural configurations. This ensures that the water shedding mechanism can be optimized for various architectural layouts. The deflectors are constructed from a material composition resistant to environmental factors. This resistance includes protection against rain, snow, and exposure to the elements, ensuring the longevity and effectiveness of the water shedding process. The deflectors are aligned in a manner that minimizes the risk of water accumulation around vulnerable areas of the structure. This alignment is particularly important during both wildfire events and adverse weather conditions. The system is designed not only to divert water effectively but also to prevent potential water-related damage to the protected structure. This includes protection against flooding, erosion, and structural compromise during wildfire events and adverse weather conditions. The design is also optimized to use the natural water shedding capability of the building's existing design by mounting it as high as possible. The design also incorporates enhanced stability to ensure effective rotation of impact sprinkler heads.

Figure 2:
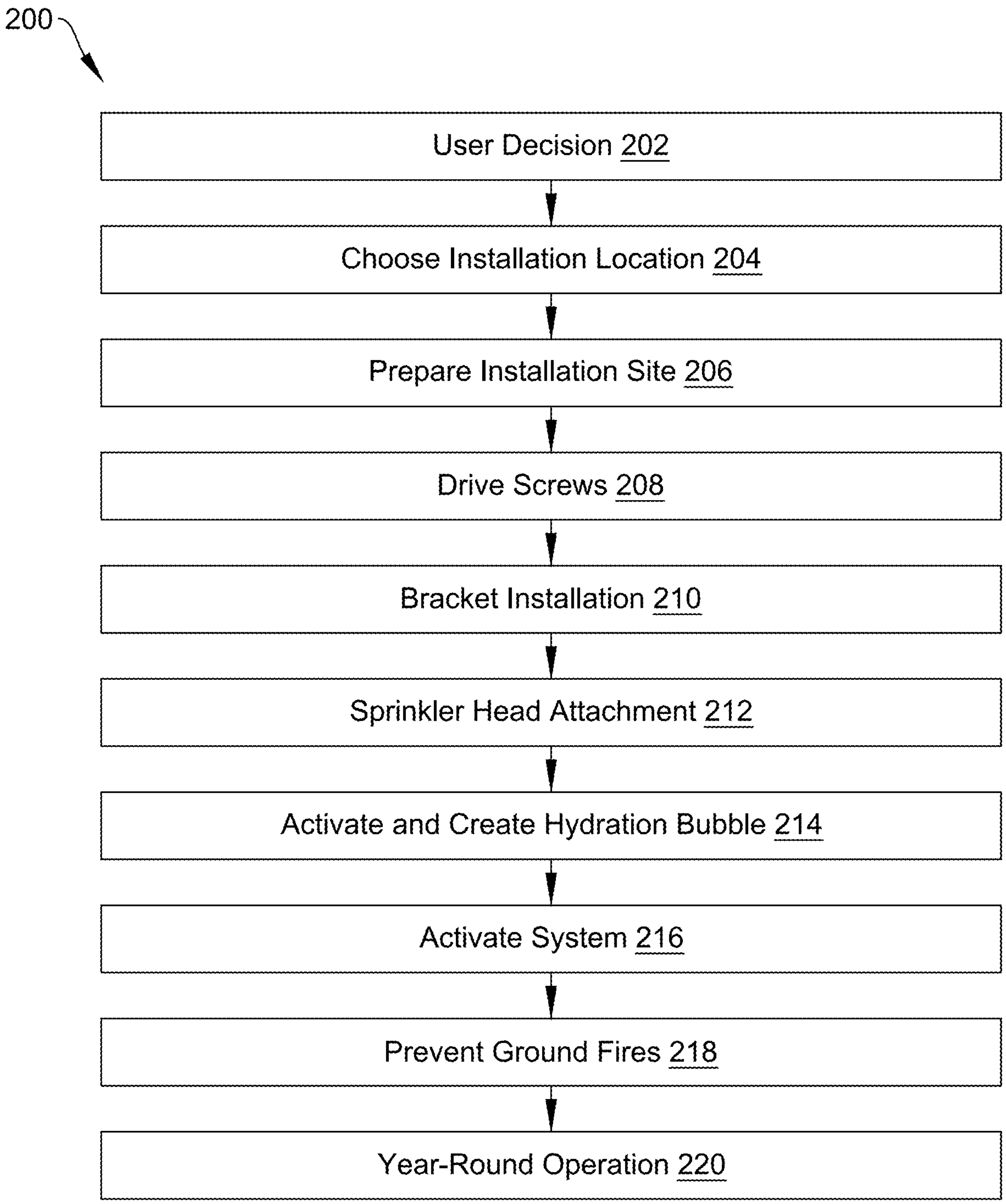
FIG. 2 is a flowchart for the working of a wildfire protection sprinkler system according to the present invention.

FIG. 2 is a flowchart (200) for the working of a wildfire protection sprinkler system according to the present invention.

At Step 202, User Decision: User decides to install the Ember Armor Wildfire Protection Sprinkler System.

At Step 204, Choose Installation Location: User selects the installation location, considering options like the peak of a home, edge of a roof, side of a building, trees, or deck posts.

At Step 206, Prepare Installation Site: User prepares the chosen location for installation.

At Step 208, Drive Screws: User drives five screws into the chosen location to secure the sprinkler system.

At Step 210, Bracket Installation: The bracket, made of powder-coated stainless steel and brass, is installed at the selected location.

At Step 212, Sprinkler Head Attachment: Sprinkler heads are attached to the bracket, providing a customizable setup.

Step 214, Activate and Create Hydration Bubble: The installed Ember Armor creates a hydration bubble around the protected structure upon activation.

At Step 216, Activate System: The system is activated, initiating the continuous generation of the hydration bubble.

Step 218, Prevent Ground Fires: The hydration bubble serves to extinguish airborne wildfire embers and prevent ground fires from advancing too close to the structure.

At Step 220, Year-Round Operation: The system is designed for year-round installation, including snowy weather and winter months. During times of freezing the system can be naturally drained using gravity by disconnecting the fire hose end closest to the ground.

FIG. 3A-3K is a representation for installing a wildfire protection sprinkler system according to the present invention. The method for installing a wildfire protection sprinkler system provides versatile mounting options easily mounted on various structures, including the peaks of homes, edges of roofs, chimneys, plumbing vents, sides of buildings, and even on trees and deck posts. The system's installation involves driving just five screws into the chosen location, or alternatively using hose clamps when fastening to existing pipes or chimneys making it accessible for homeowners seeking a reliable and user-friendly permanently mounted solution designed to withstand the outdoor elements and be available to firefighting services year-round. Post-installation, the method establishes a hydration bubble around the protected structure, extinguishing wildfire embers and creating a wet perimeter to prevent ground fire encroachment. The installation features a durable powder-coated stainless steel and brass bracket with a high melting point, designed for year-round use, eliminating the need for seasonal removal even in snowy weather. This bracket is strategically installed to shed rainwater and sprinkler water away from the building, ensuring lasting durability and a strong connection crucial for sustained wildfire protection. The method supports customizable sprinkler heads, providing flexibility based on specific needs, and includes a filter-free sprinkler head with directional control capability in the kit to minimize clogging risks and structural water damage risks during wildfire events. Furthermore, the installation incorporates a firefighter alert system, mounting a sign at the front entrance to enhance emergency response and awareness, making the system a comprehensive and adaptable solution for wildfire protection.

Figure 3A:
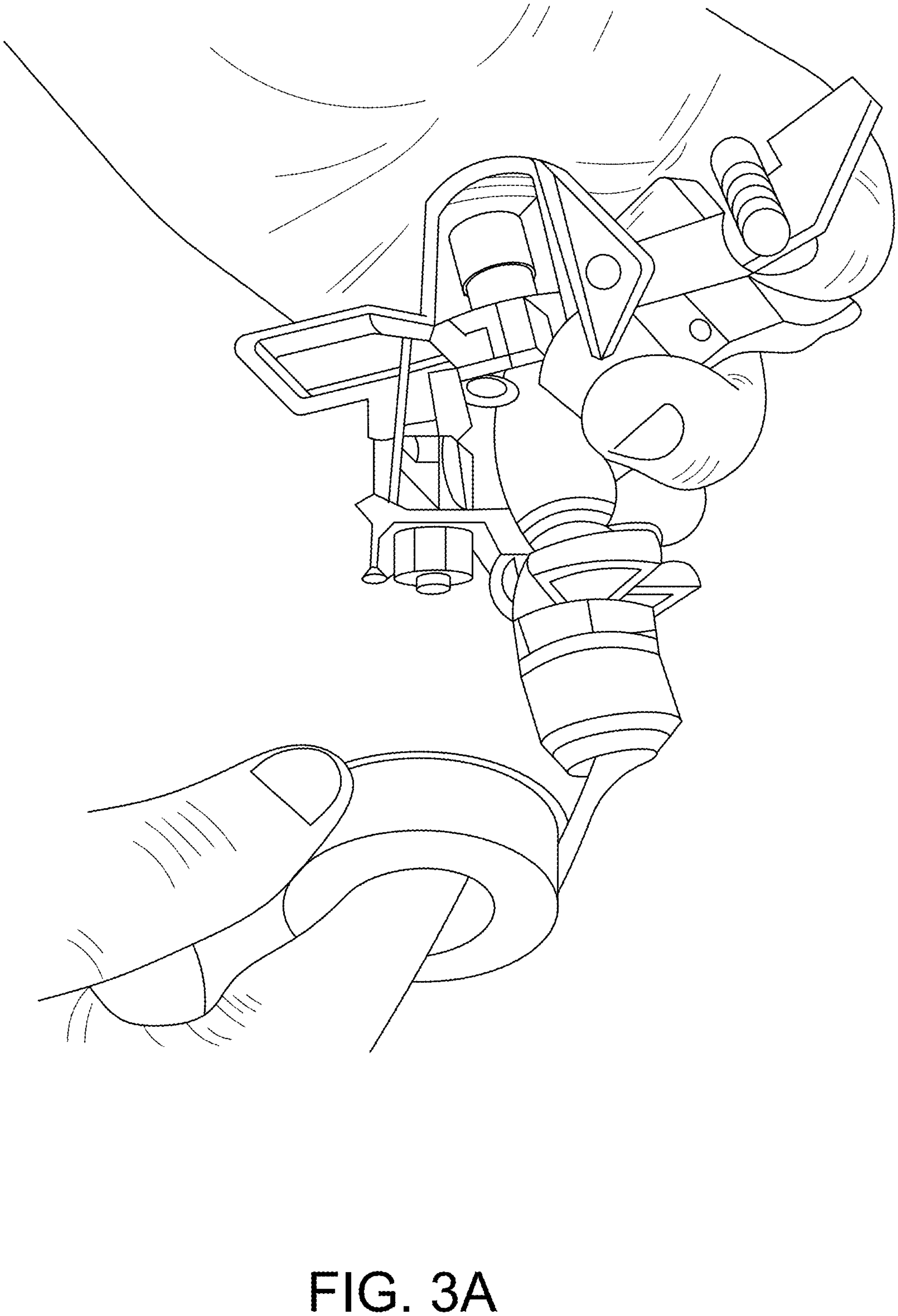
FIG. 3A-3K is a representation for installing a wildfire protection sprinkler system according to the present invention.

FIG. 3A demonstrates a crucial step in sprinkler head installation. After removing the sprinkler head from the packaging, Teflon tape is meticulously wrapped around the base threads, 11 to 15 times. This precise application ensures a secure seal, minimizing the risk of the sprinkler head coming loose during extended use. This step enhances the overall reliability and longevity of the sprinkler system.

Figure 3B:
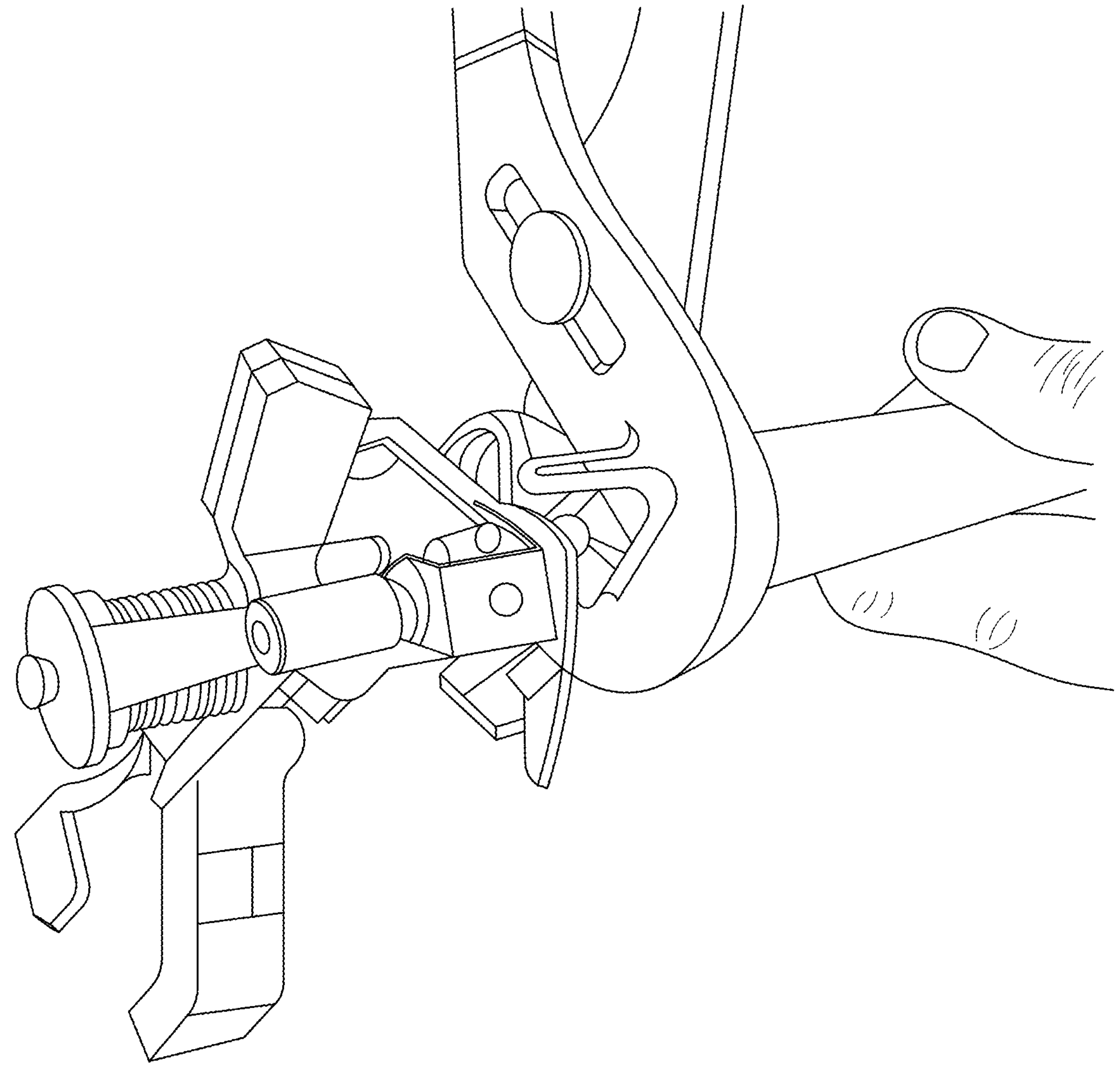

In FIG. 3B, a pivotal step is demonstrated where a wrench or vice grips are employed to tighten the sprinkler head securely onto the sprinkler arm. This uncomplicated yet vital process ensures a robust and stable connection, concluding the installation and guaranteeing optimal performance of the sprinkler system.

Figure 3C:
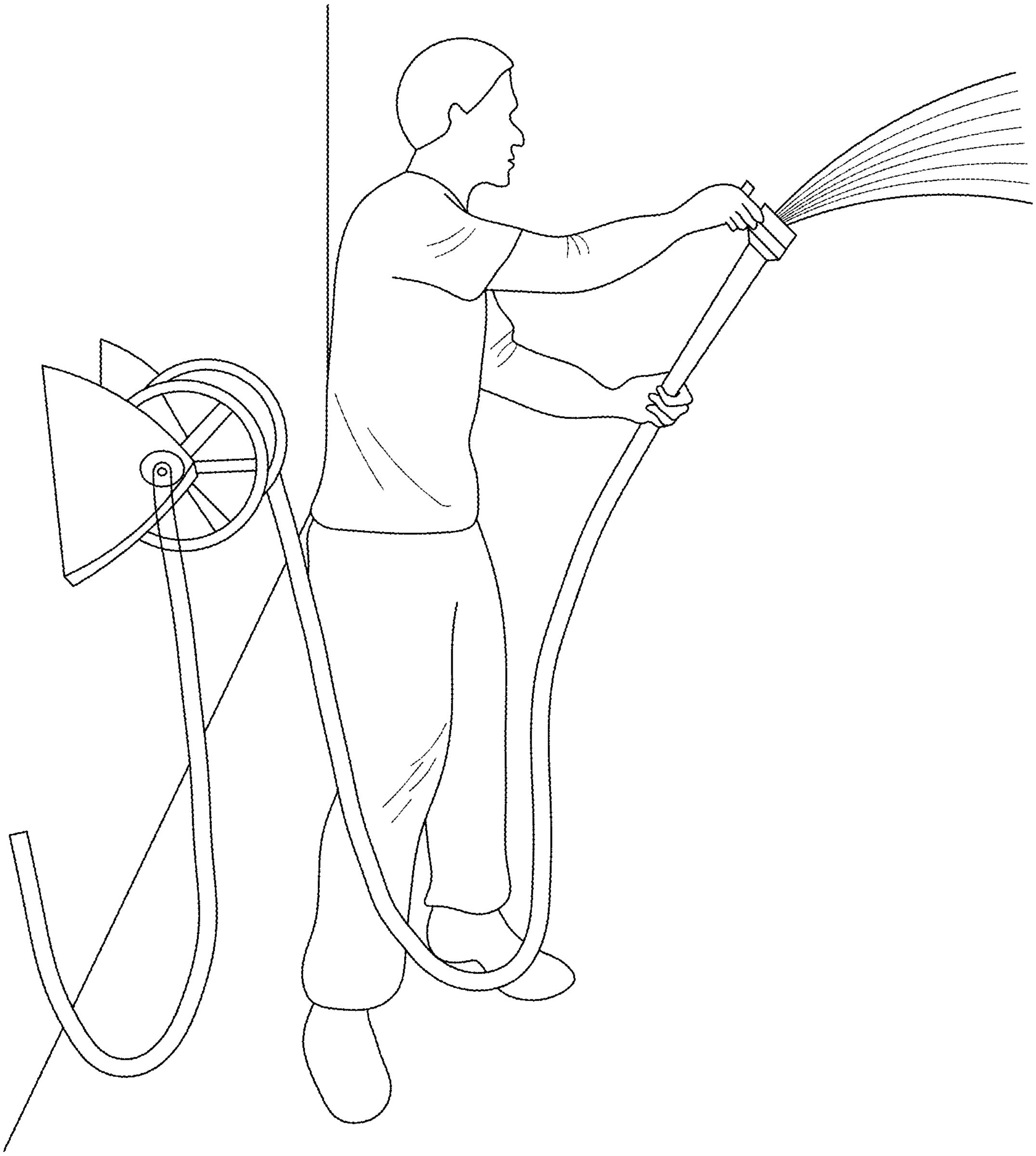

In FIG. 3C, users are advised to connect the sprinkler to the hose while on the ground and ensure proper functionality before attaching it to the house. This precautionary measure eliminates the need to climb a ladder for adjustments at a higher elevation, streamlining the installation process and enhancing user convenience.

Figure 3D:
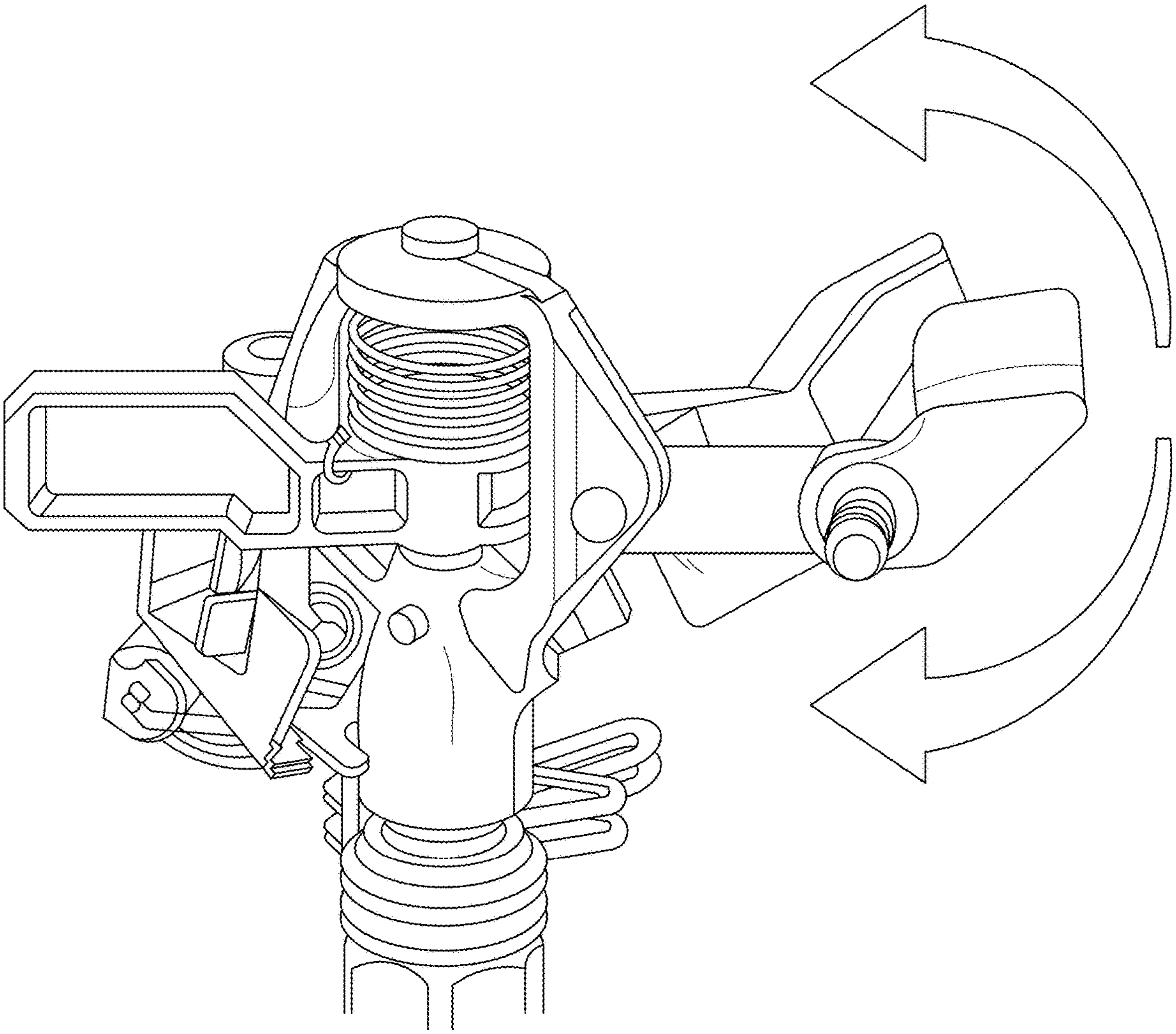

In FIG. 3D, the illustration guides users to adjust the deflector shield on the sprinkler head by raising or lowering it. By manipulating the position of the shield, users can control the trajectory of the water stream-lowering it redirects the stream into a lower arc, creating more mist, while raising it provides more distance. This simple adjustment mechanism allows users to fine-tune the sprinkler's spray pattern based on their specific needs and preferences.

Figure 3E:
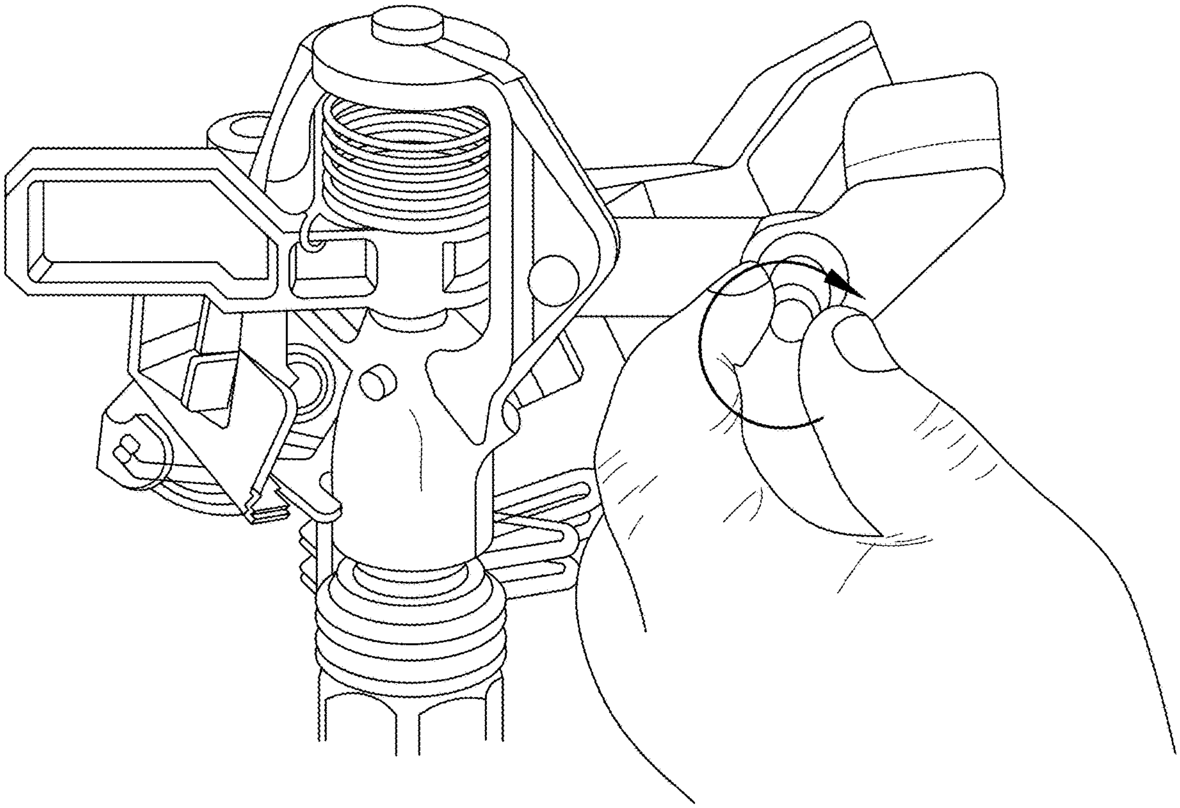

In FIG. 3E, users are instructed to change the position of the diffuser pin, a large screw anchored to the base of the sprinkler head. To decrease the coverage distance, the pin should be screwed in a clockwise direction until it sits over the water nozzle. Conversely, for a more concentrated and extended stream, users can unscrew the pin entirely or remove it. This straightforward adjustment allows users to customize the sprinkler's spray pattern according to their specific preferences and watering needs.

Figure 3F:
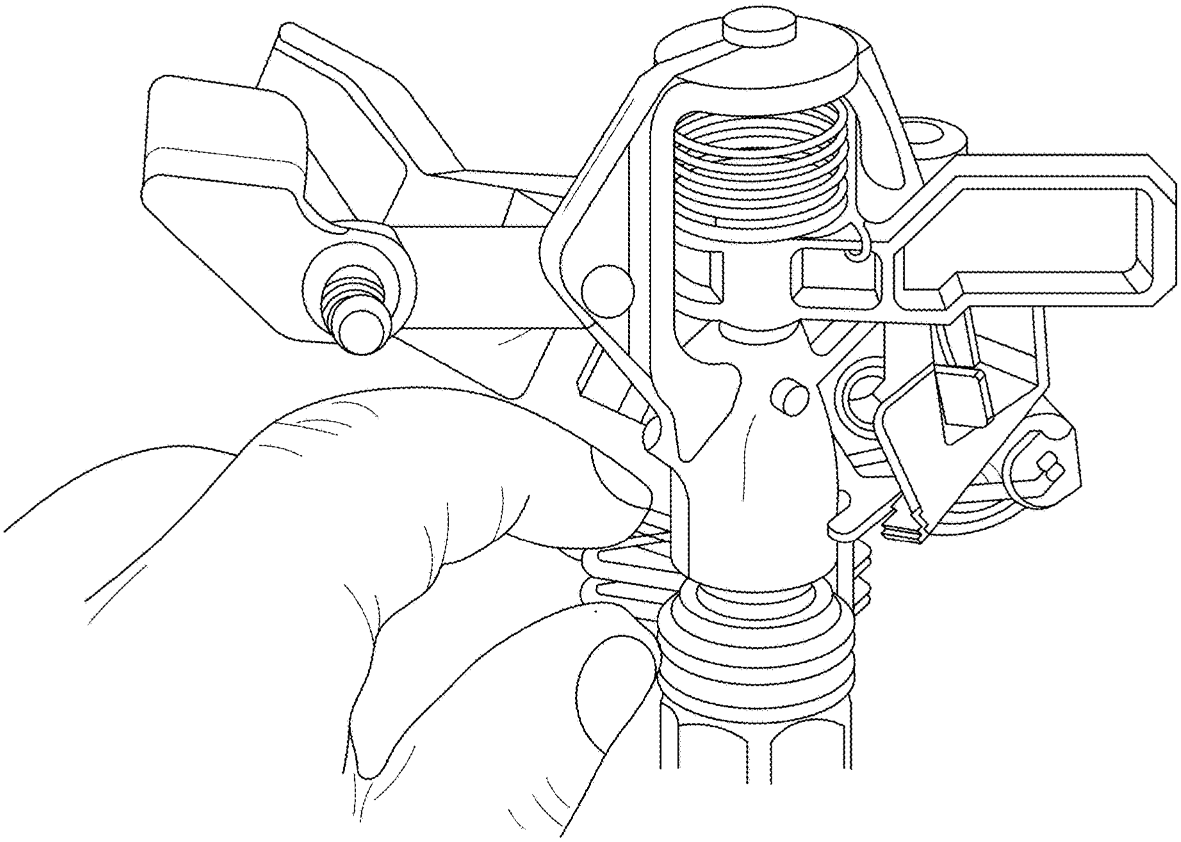

In FIG. 3F, users are directed to utilize the friction collars to modify the spray pattern of the sprinkler. By twisting the metal clamps around the base of the sprinkler head into different positions, users can determine the movement of the sprinkler head. The proximity of the collars influences the watering range, with closer positions resulting in a narrower spray pattern. This user-friendly adjustment feature allows for easy customization of the sprinkler's coverage based on specific watering requirements.

Figure 3G:
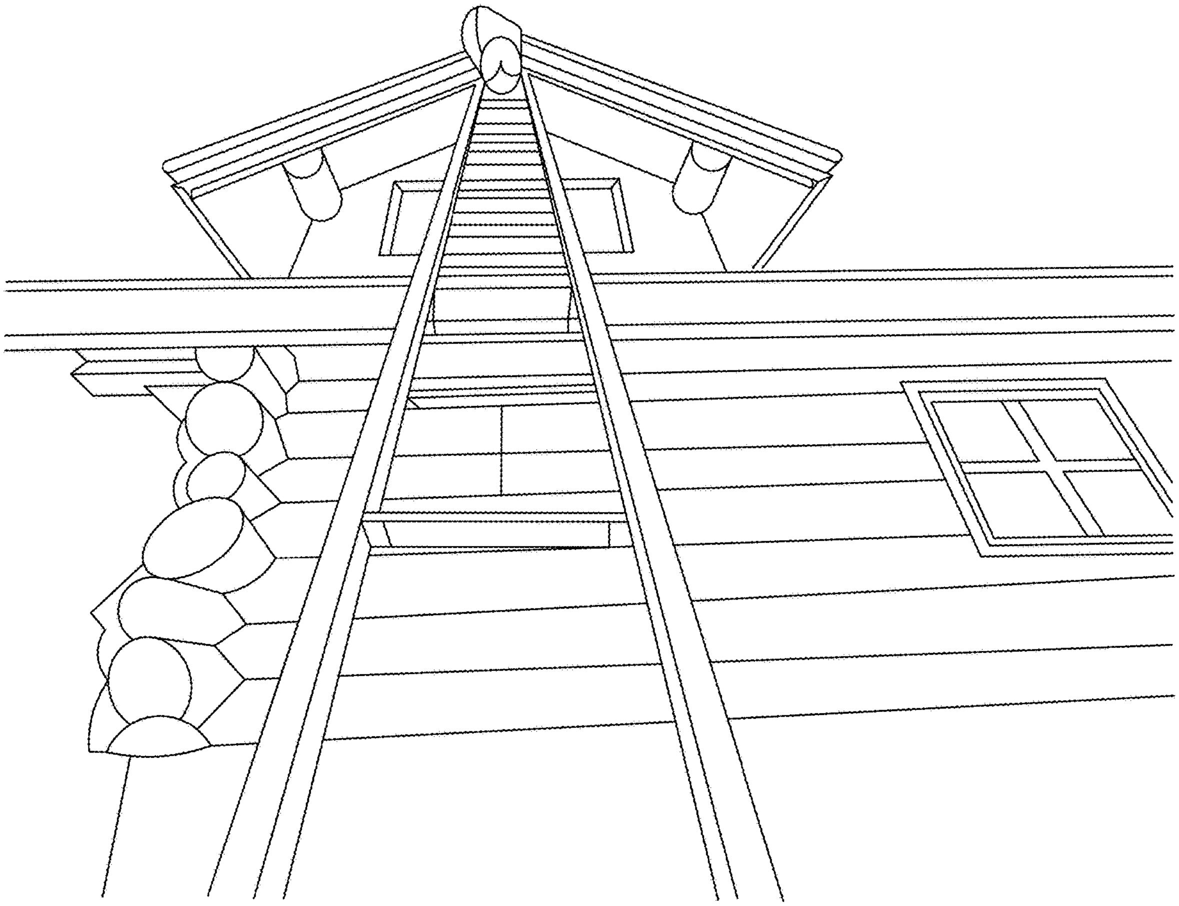

In FIG. 3G, users are instructed to position a ladder below the peak of the roof and climb it with a drill in hand. This step is crucial for accessing elevated areas and signifies the preparation for a subsequent installation or adjustment process. The clear guidance ensures user safety and efficient execution of tasks at elevated locations.

Figure 3H:
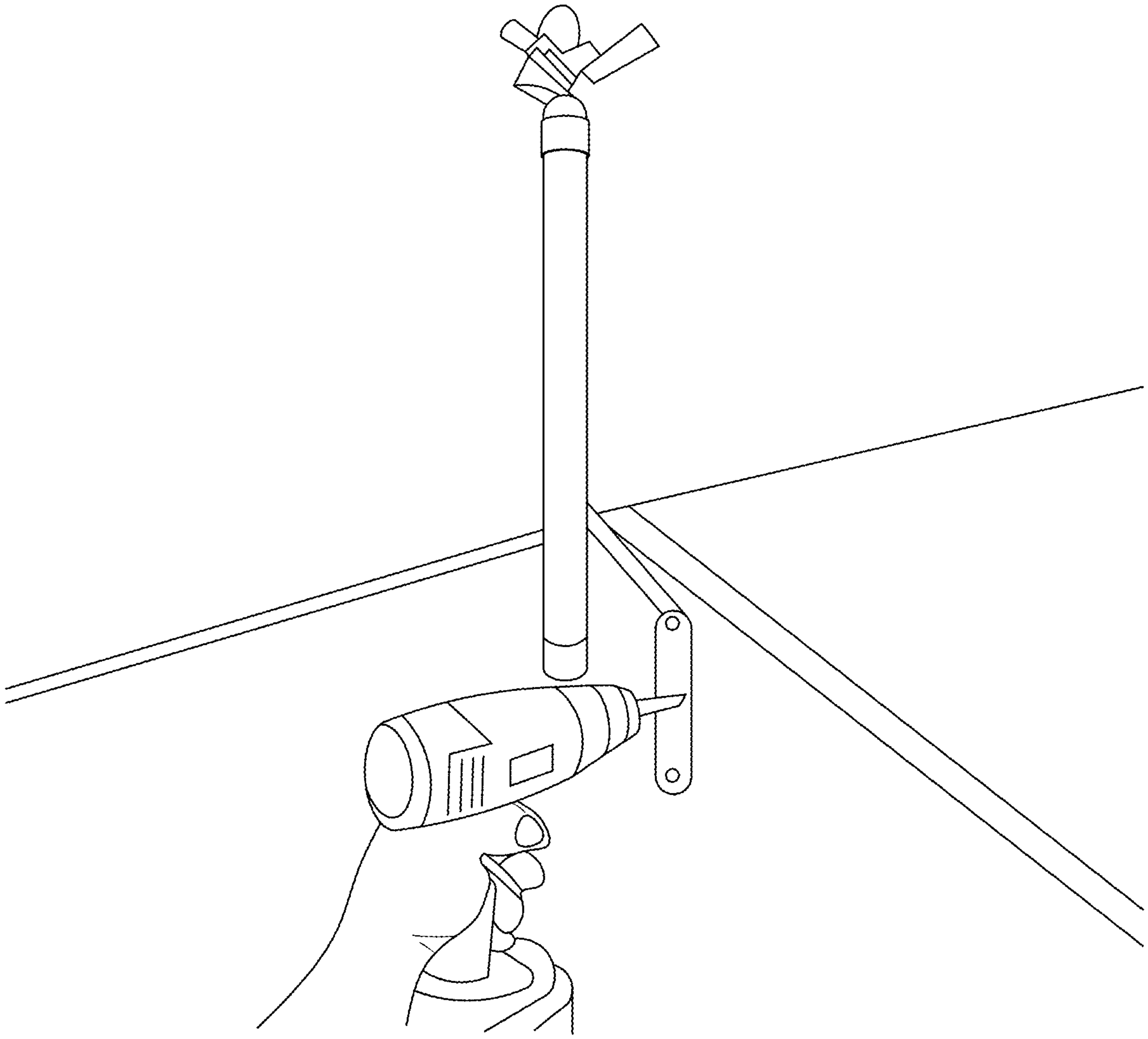

In FIG. 3H, users are advised to install the sprinkler at the peak of the house, a strategic placement to prevent snow accumulation from pushing it off in the winter and to maximize coverage. If the facia board joins in the middle, the instructions emphasize offsetting the sprinkler slightly for a secure installation. The use of provided screws or longer ASQ certified outdoor decking screws is recommended to ensure a robust and reliable attachment. This step ensures optimal performance and durability of the sprinkler system, especially during adverse weather conditions. Then the step involves attaching the hose to the sprinkler system and completing the installation process and enabling the system to draw water for effective operation. It signifies the final connection necessary to make the sprinkler ready for use.

Figure 3I:
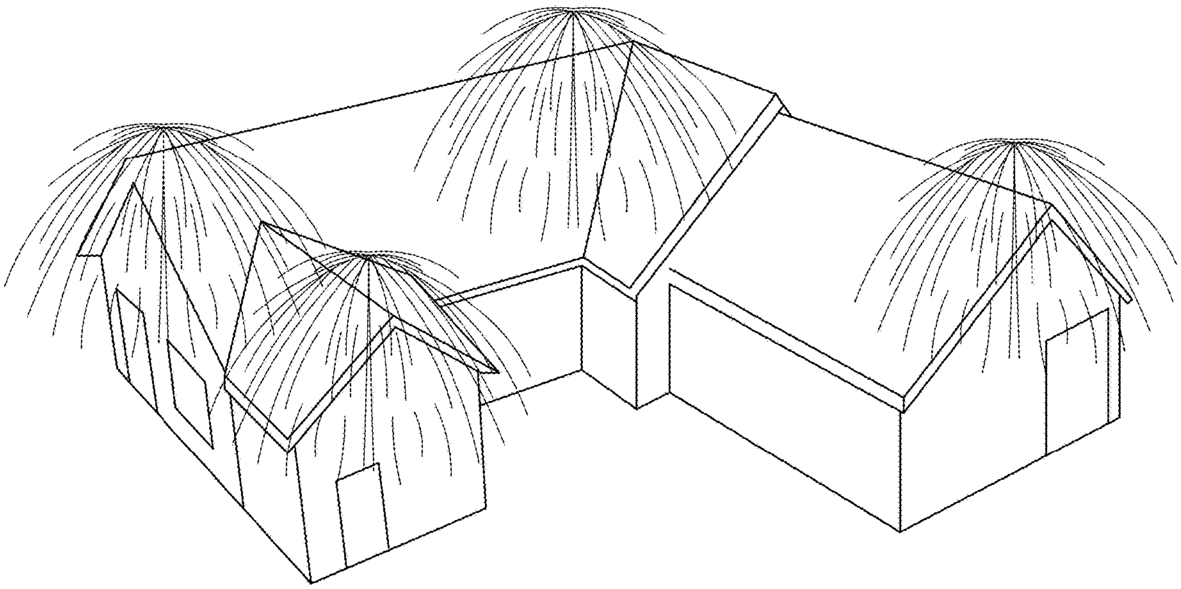

In FIG. 3I, after attaching the hose, it is crucial to test each sprinkler individually to verify that the stream, distance, and spray align with expectations. Ensure that water isn't directly hitting the chimney and isn't entering any vents. Check the coverage to confirm that all necessary areas, including most of the roof, gutters, and the surrounding 10-foot ground, are adequately wetted to prevent ground fires and radiant heat from igniting siding. If the coverage is insufficient, consider adding more sprinklers. Caution against cutting corners, as it could jeopardize the home; ensure all supporting equipment is metal or fire-resistant, including hoses and fixtures. This thorough testing process is essential for the effective and reliable performance of the wildfire protection sprinkler system.

Figure 3J:
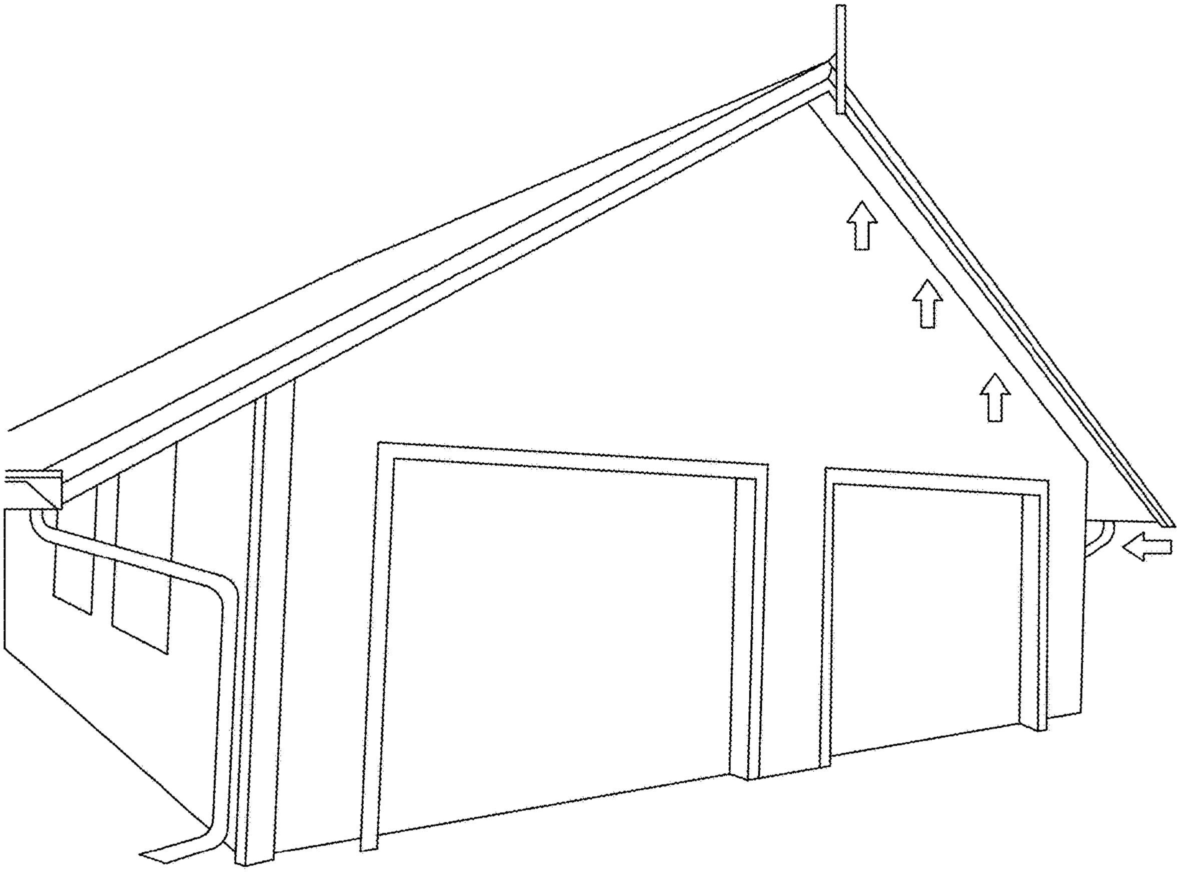

In FIG. 3J, after ensuring satisfactory coverage, users are directed to secure the hose by using hose clamps every two feet. This involves attaching the hose to the underside of the facia board or the soffits if there isn't a lip on the facia board. Caution is given to avoid 90-degree angles that may cause kinking, leading to pressure loss. Additionally, users are advised to ensure that all parts of the hose naturally drain water when disconnected to prevent winter freezing damage. During periods of non-use, any excess hose should be rolled up on the side of the building for easy access by firefighters. This step ensures a secure and organized setup while promoting the longevity of the hose and the overall effectiveness of the wildfire protection sprinkler system.

Figure 3K:
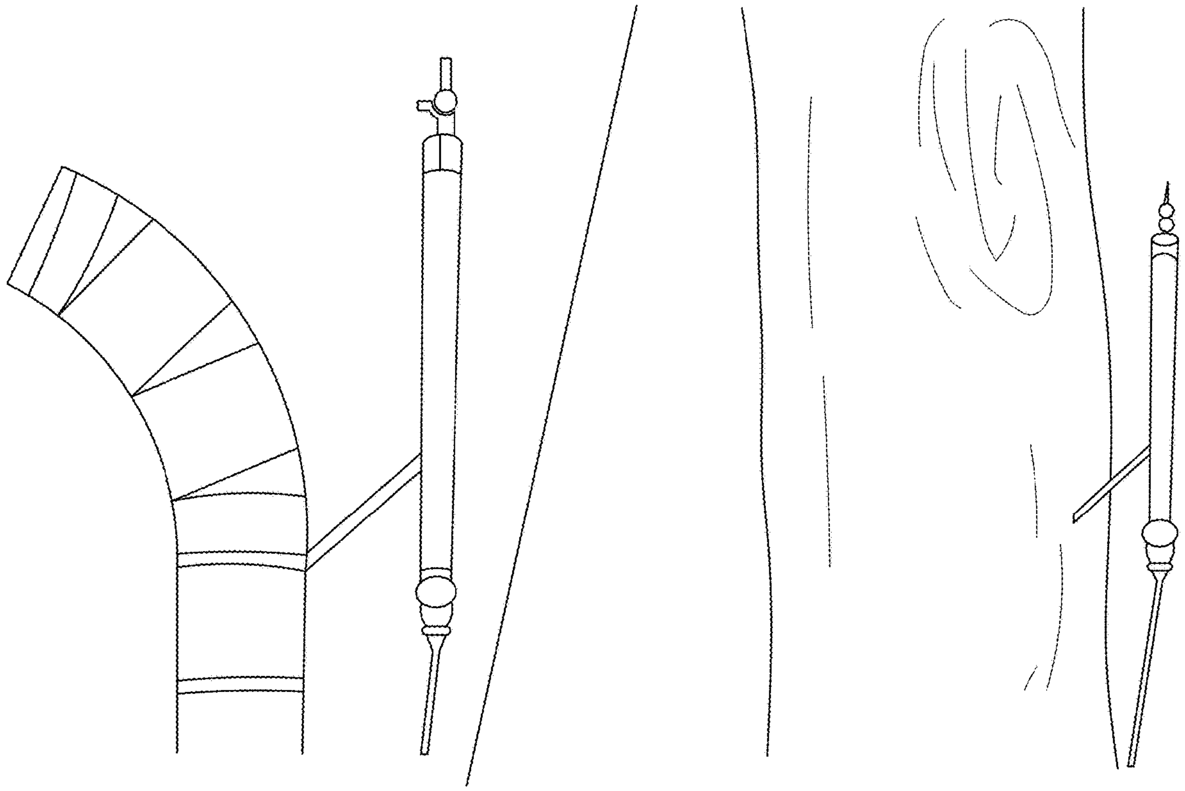

In FIG. 3K, the versatility of Ember Armor is highlighted, indicating its capability to be attached to trees using longer 3-6" screws. Moreover, the system can be affixed to wood stove chimneys and plumbing vents using standard hose clamps (not provided). This feature expands the application of Ember Armor to various structures, offering flexibility in its deployment for wildfire protection.

While the subject disclosure is described and illustrated with respect to certain preferred and alternative embodiments, it should be understood that various modifications can be made to those embodiments without departing from the subject disclosure, the scope of which is defined in the following claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms the terms "coupled to" and "coupled with" are also used within a networking context to represent "communicatively coupled with" where two networked elements are able to communicate with each other over a network, possible via one or more intermediary device.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention.

The invention claimed is:

1. A wildfire protection sprinkler system comprising:

a bracket;

a sprinkler head designed for mounting on the bracket;

a hose for connecting the sprinkler head mounted on the bracket with a water outlet;

the sprinkler head and hose operable to create a hydration bubble around a protected structure upon activation, said hydration bubble extinguishing airborne wildfire embers and establishing a wet perimeter to prevent advancement of ground fires;

wherein the bracket further comprises an angled arm and a cross member, the angled metal arm comprising one or more deflectors extending upward from a top surface of the angled arm, the one or more deflectors configured to channel rainwater and sprinkler water away from the protected structure.

2. The wildfire protection sprinkler system of claim 1, wherein said bracket exhibiting a melting point of at least 927° C. for brass and over 1400° C. for stainless steel.

3. The wildfire protection sprinkler system of claim 1, wherein a structure of said bracket designed to minimize vibrations, wherein the vibrations hamper a rotation of impact sprinklers.

4. The wildfire protection sprinkler system of claim 1, wherein said bracket angled arm includes a carefully calculated angle and height configuration, and said bracket is formed to facilitate secure attachment to a facia board.

5. The wildfire protection sprinkler system of claim 1, wherein said bracket is crafted to provide a maximum hydration bubble around the structure, essential for wildfire protection.

6. The wildfire protection sprinkler system of claim 1, wherein the bracket leverages natural water shedding capability when mounted on a peak of a building structure, allowing sprinkler water spray to rain down from a top of the roof, optimizing distribution of water for enhanced wildfire protection.

7. The wildfire protection sprinkler system of claim 1, wherein the sprinkler head is mountable on structures, such as a peak of a home, an edge of a roof, a side of a building, on trees, and deck posts, allowing for versatile and strategic installation.

8. The wildfire protection sprinkler system of claim 1, wherein the colors of the bracket are carefully selected to match homeowner preferences, ensuring that the protective system complements the visual aesthetics of the protected structure.

9. The wildlife protection sprinkler system of claim 1, wherein the hose is mounting under facia board using clips.

10. The wildlife protection sprinkler system of claim 1, wherein the hose makes the sprinkler accessible from the ground.

11. The wildfire protection sprinkler system of claim 1 further comprising:

an integrated firefighter alert system, comprises a property sign mounted at the front entrance, notifying firefighters of the location of wildfire protection sprinklers; and wherein the hose is connected to a water source of the protected building, wherein the hose is a fire-resistant hose and is mounted under a facia board of the protected structure using clips;

wherein the bracket is affixed to the facia board and the angled arm is sized to extend beyond a roof line of the protected structure;

wherein the sprinkler head comprises a shield to control water spray in a particular direction; and wherein the sprinkler head comprises a diffuser pin adjustable to control water spray coverage distance.

12. A method for installing a wildfire protection sprinkler system, comprising the following steps:

selecting a suitable location for installing the wildfire protection sprinkler system, considering options such as a peak of structures, edges of roofs, sides of buildings, trees, or deck posts;

preparing the selected suitable location for installation, ensuring it is free from obstructions and suitable for secure mounting;

driving five screws into the selected suitable location to facilitate a secure attachment of the wildfire protection sprinkler system;

installing a bracket, constructed from powder-coated stainless steel and brass, the bracket further comprising an angled arm and cross member, the angled arm having a set of deflectors configured to channel rainwater and sprinkler water away from the protected structure;

attaching a plurality of sprinkler heads to the bracket, providing customizable coverage based on the selected suitable location;

initiating the wildfire protection sprinkler system, creating a hydration bubble around the protected structure upon installation, aiming to extinguish airborne wildfire embers and establish a wet perimeter to prevent advancement of ground fires.

13. The method of claim 12, wherein the method ensures compatibility with a variety of sprinkler heads, including a filter-free sprinkler head in a kit to minimize a risk of clogging during water drawing from potentially dirty sources during a wildfire event.

14. The method of claim 12, wherein a step of employing a year-round installation design includes designing the bracket to shed rainwater and sprinkler water away from the building, contributing to lasting durability and a robust connection.

15. A wildfire protection system comprising a structure-mounted bracket apparatus comprising:

an angled arm having a set of strategically positioned deflectors extending therefrom, the set of deflectors positioned to channel rainwater and sprinkler water away from a protected structure;

the set of deflectors connectable to the arm in various positions allowing adaptation to diverse structural configurations for optimal water shedding;

the bracket comprising a material composition resistant to environmental factors, including but not limited to, rain, snow, and exposure to the elements;

an alignment that minimizes a risk of water accumulation around vulnerable areas of the protected structure during both wildfire events and adverse weather conditions.

16. The wildfire protection system of claim 15, wherein an alignment of the set of deflectors minimizes a risk of water-related damage to the protected structure, including but not limited to flooding, erosion, and potential structural compromise, during both wildfire and adverse weather events.

* * * * *